May 15, 1934.  H. A. HARMAN  1,958,428
AUTOMATIC STEERSMAN
Filed June 15, 1932  7 Sheets-Sheet 2
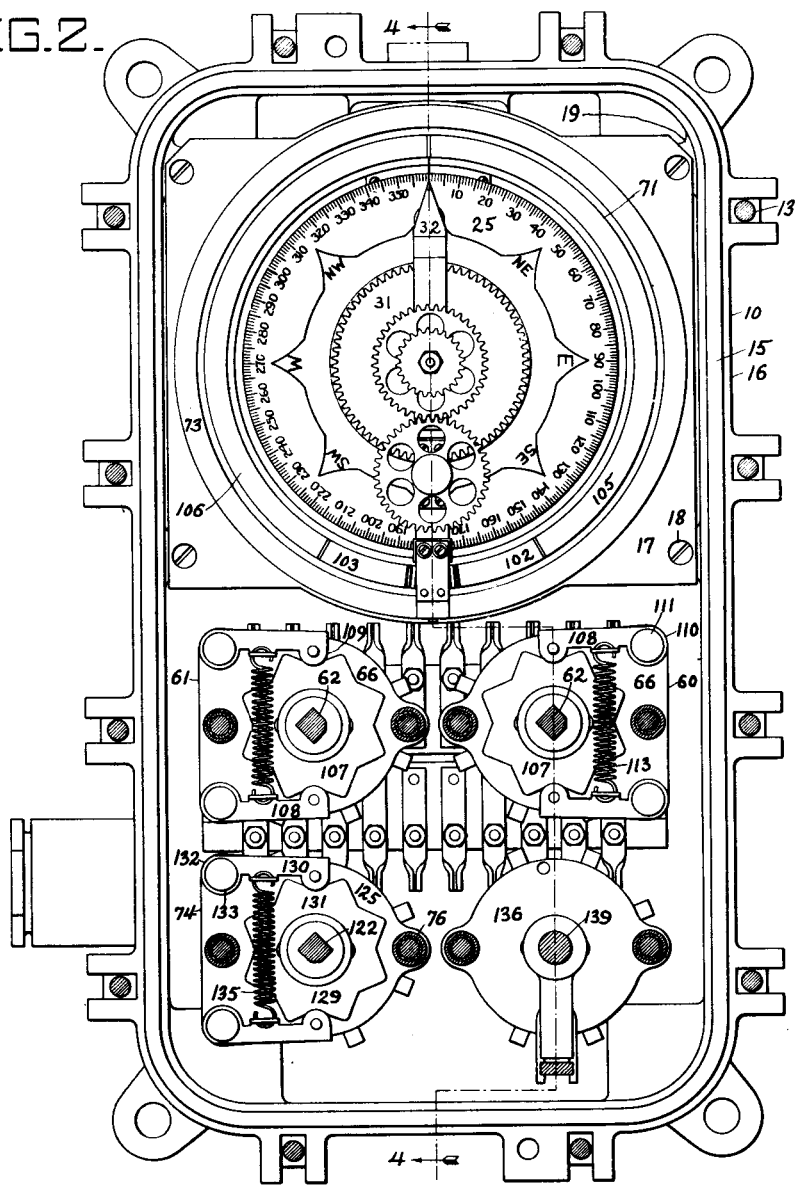
INVENTOR
HYDE A. HARMAN.
BY
Robert A. Lomunder
ATTORNEY

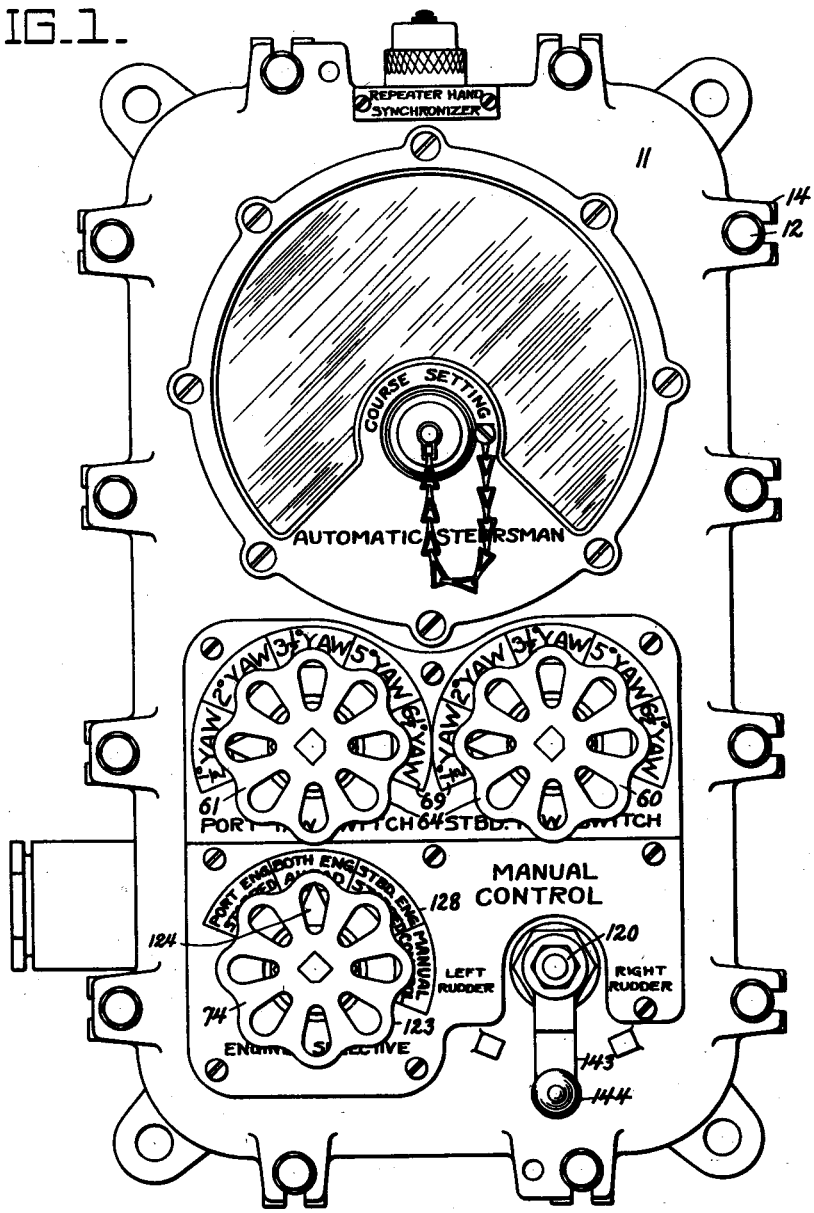

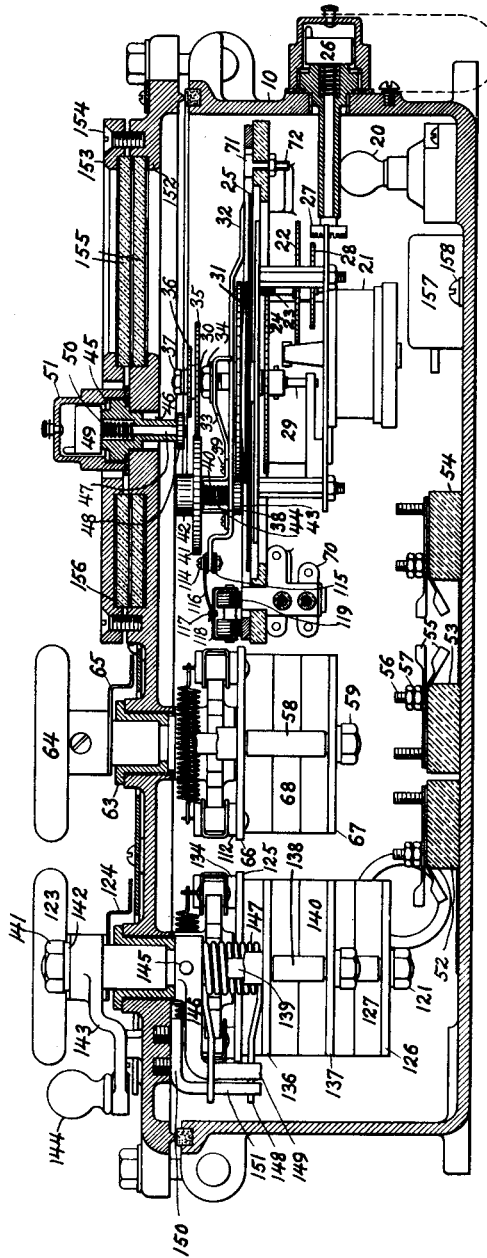

May 15, 1934.                    H. A. HARMAN                    1,958,428
                              AUTOMATIC STEERSMAN
                              Filed June 15, 1932           7 Sheets-Sheet 4
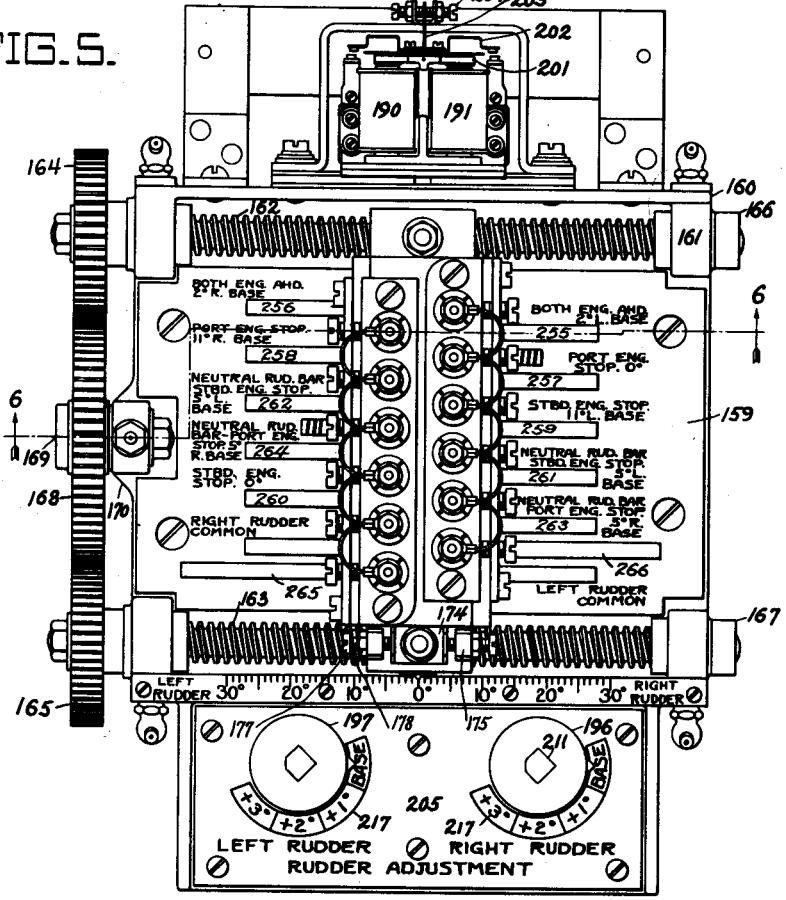
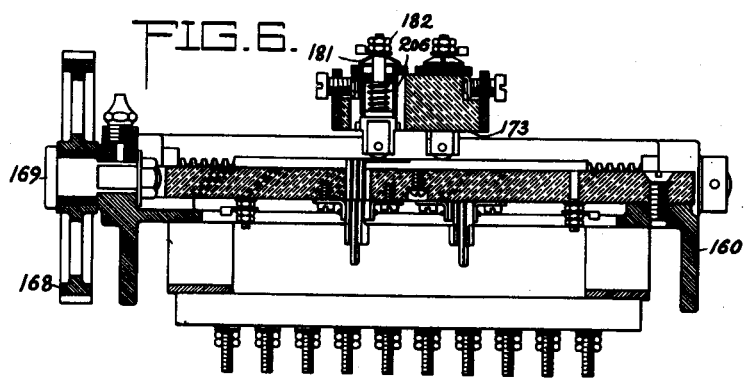
INVENTOR
HYDE A. HARMAN.
BY
ATTORNEY

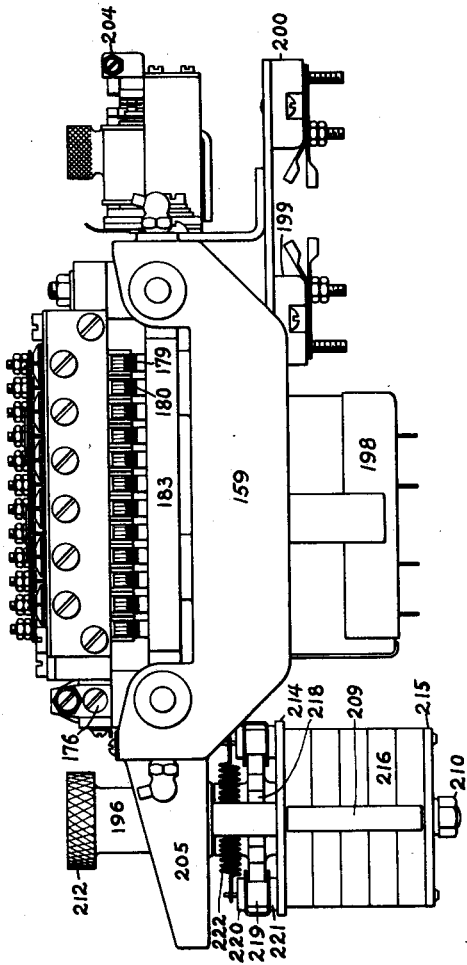

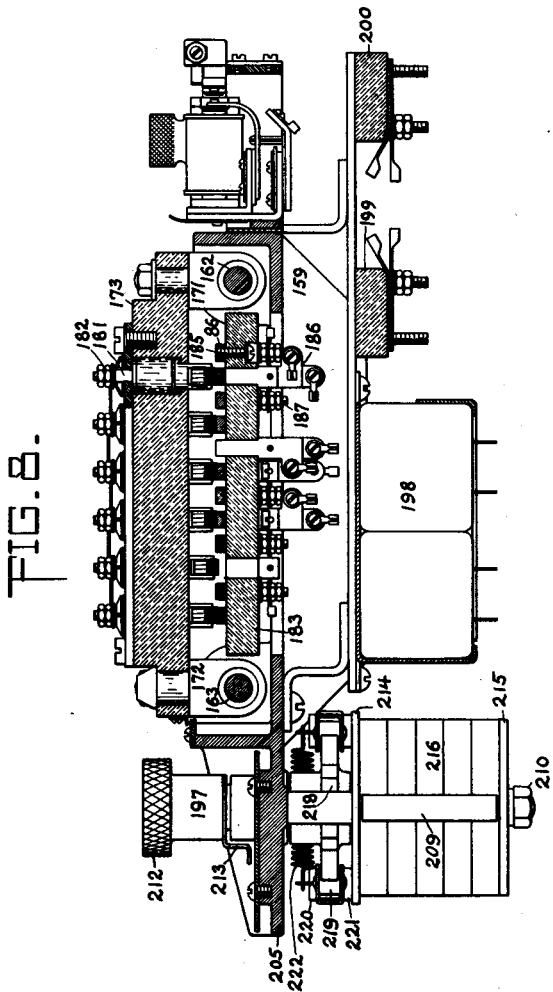

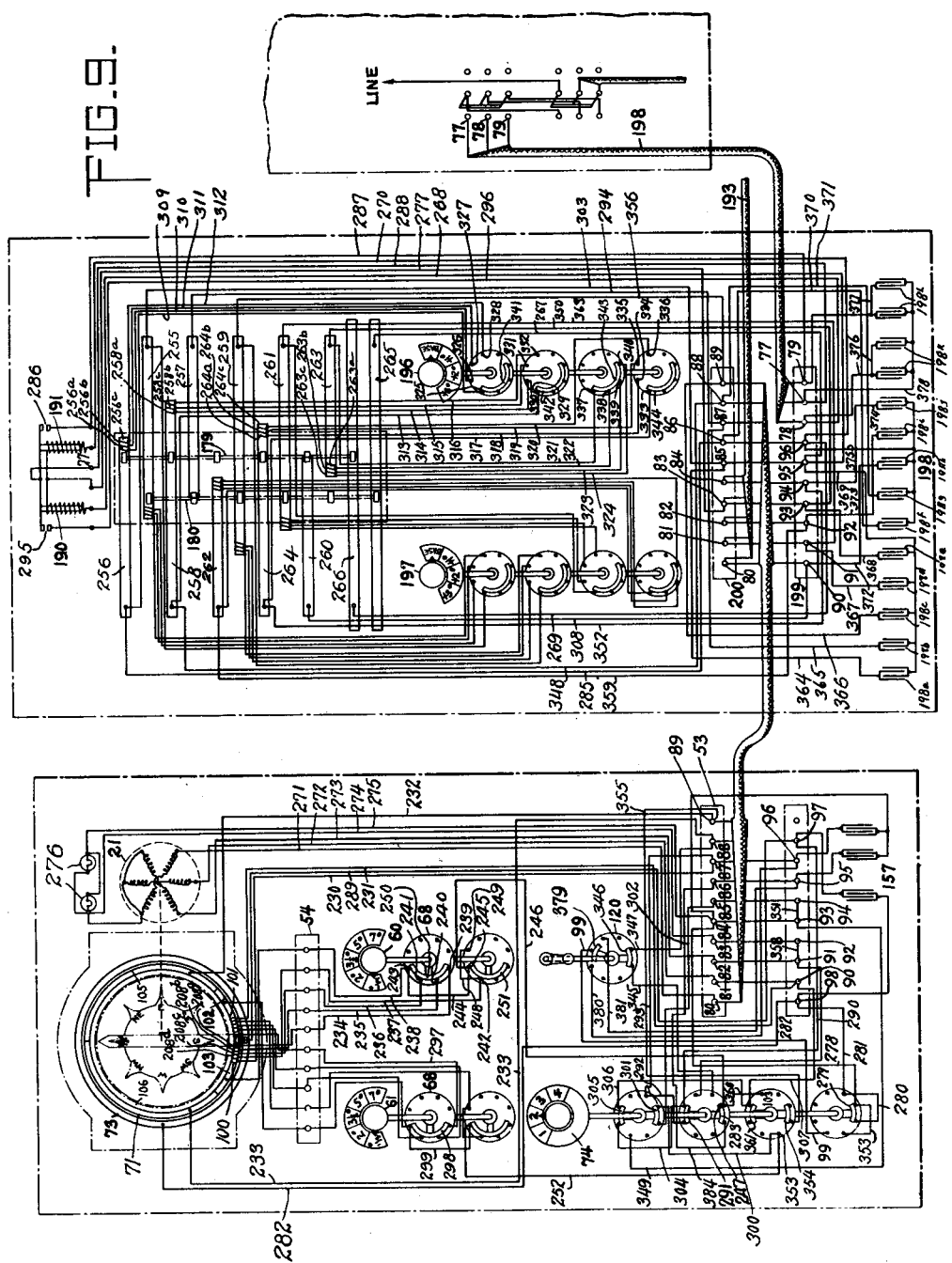

Patented May 15, 1934

1,958,428

UNITED STATES PATENT OFFICE 1,958,428

AUTOMATIC STEERSMAN

Hyde A. Harman, United States Navy

Application June 15, 1932, Serial No. 617,394

17 Claims. (Cl. 172—282)

(Granted under the act of March 3, 1883, as amended April 30, 1928; 370 O. G. 757)

This invention relates broadly to improvements in an automatic steersman, and more particularly to a device for obtaining improved rudder manipulation and one in which the adjustments can be effected from a distant control station.

An object of this invention is to provide an automatic steering device that returns the rudder to the zero or other neutral position each time the vessel is exactly on the selected course.

Another object of this invention is to provide an automatic steering device that, when making large changes of course, eases the rudder before the vessel reaches the new course.

A further object of this invention is to provide an automatic steering device that permits the adjustment of the rudder angle limit device, electrically, from a distant control station.

With the above and other objects in view, this invention consists in the construction, combination and arrangement of parts as will be described more fully hereinafter in connection with the accompanying drawings, in which:

Fig. 1 is a plan view of the automatic steersman of my improved device;

Fig. 2 is a plan view of the automatic steersman of my improved device with the cover removed;

Fig. 3 is a view of the contact segments of the inner ring of Fig. 2;

Fig. 4 is a sectional view of the automatic steersman, taken on line 4—4 of Fig. 2;

Fig. 5 is a plan view of the rudder angle limit panel of my improved device;

Fig. 6 is a sectional view of the rudder angle limit panel taken on line 6—6 of Fig. 5;

Fig. 7 is an end view of the rudder angle limit panel of my improved device;

Fig. 8 is a transverse sectional view of the rudder angle limit panel of my improved device;

Fig. 9 is a wiring diagram of my invention.

Referring more particularly to the drawings in which similar numerals refer to similar parts throughout the several views, in Fig. 2, 10 indicates a casing having a cover 11, Fig. 1, removably secured thereto by nuts 12 threaded on dog bolts 13, Fig. 2, that fit into lugs 14 of the cover 11. A water-tight fit is made between the cover 11 and the casing 10, Fig. 2, by having a tongue extending from the cover 11, Fig. 1, bear firmly against a rubber gasket 15 placed in a groove machined in a flanged edge 16 of casing 10.

A conventional type of repeater compass is positioned in the upper portion of casing 10 by means of plate 17 fastened by machine screws 18 to ears 19 that are integral parts of the casing 10. Positioned in casing 10 on both sides of the compass are lubber line lights 20 for illuminating the compass card. The compass is provided with a motor 21 that, through gears 22, 23 and 24, moves the compass card 25. Protruding through the cover 10 is a hand compass synchronizer 26 that through gears 27 and 28 operates to adjust the repeater compass to agree with the master gyro compass. An operating shaft 29 for the card 25 has threaded into it a shaft extension 30. Secured to the card 25 is a gear 31 and mounted on the extension shaft 30 is a pointer 32 which bears against a washer (not shown) on the top of gear 31. The pointer 32 is held in place by a strong back or spring 33 and nut 34 on the extension shaft 30. Two gears, a driving intermediate gear 35 and a course setting gear 36, are sweated together and rotatably positioned on a shoulder on the extension shaft 30 so that shaft 30 acts as a hub for said gears. To prevent displacement of the gears 35 and 36, a nut 37 is placed on the end of shaft 30.

A support 38 secured to pointer 32 by screws 39 holds a shaft 40 that has one end extending through the upper part of the support 38 and the other end extending through the pointer 32. A gear 41 meshing with gear 35 is fastened adjacent the top of the support to the shaft and placed on one end of the shaft 40 is a knurled knob 42. On the under side of the pointer 32 the shaft 40 has affixed thereto a pinion 43 that meshes with gear 31 secured to card 25. A spring 44 is placed around shaft 40 to keep the gears meshed and to hold pinion 43 from dragging on the card 25.

Positioned by a bushing 45 threaded into an aperture 46 in the cover 11 is a shaft 47 that has on one end thereof a pinion 48 adapted to mesh with gear 36 and on the opposite end a knurled knob 49. A spring 50 placed around shaft 47 in a countersunk portion of the bushing 45 bears against knob 49 thereby holding the shaft 47 in a raised position when there is no pressure on knob 49, so that pinion 48 will not mesh with gear 36 unless moved in place by pressing on the knob 49. A protective cap 51 for the knob 49 is threaded into cover 11.

Terminal bases 52, 53 and 54 are secured to the casing 10. Each of these bases is furnished with terminals 55 that have terminal screws 56 and nuts 57. Over terminal base 53 and fastened to cover 11 by studs 58 and nuts 59 are a starboard yaw switch 60 and a port yaw switch 61. The switches 60 and 61 are provided with shafts 62 that extend through stuffing boxes 63 in cover 11. On the upper end of the shafts 62 are handles 64 to which pointers or indicators 65 are secured.

The switches 60 and 61 are rotary contact switches and are provided with upper plates 66, lower plates 67 and contact plates 68.

Secured to the cover 11 around the stuffing boxes 63 for the switches 60 and 61 and in under the indicators 65 are indicating plates 69 that have marked thereon in degrees the amount of yaw allowed by the switches 60 and 61 before corrective rudder is applied. The switches 60 and 61 are connected by wires through terminal base 54 to terminals 70 for segments on an inner ring 71 monuted around the compass card 25 on plate 17 by machine screws 72. The segments on inner ring 71 are shown more clearly in Fig. 3. Also, mounted on plate 17 is a solid outer contact ring 73 that is reasonably spaced from inner ring 71 and through terminal base 52 connected with engine selective switch 74. The inner ring 71 is divided into fifteen segments which are insulated from each other. The central eleven segments, Fig. 3, are very narrow. The central segment 75 is the zero return segment and is directly connected through wire 289 to contact 97, Fig. 9. The segments 100 and 101 are the right and left rudder easing segments and are directly connected through wires 230 and 231 to contacts 87 and 90 respectively. The four narrow segments 207a, 207b, 207c, 207d and 208 on each side of the zero segment 75 provide for adjusting the degree of yaw before corrective rudder is applied. Through switches 60 and 61, one, two, three or all four of these segments may be electrically connected with the segments 102 and 103 respectively, which in turn are electrically connected to the engine selective switch 74. The extreme segments 105 and 106 on either side of ring 71 are directly connected through wires 232 and 233 respectively to contacts 88 and 89 and provide for the application of eleven to fourteen degrees rudder. The segments 102 and 103 provide for the application of the same angle of rudder as do the four narrow segments 207a, 207b, 207c, 207d and 208a, 208b, 208c, 208d on each side of the segment 75 and this latter rudder angle is adjustable separately on each side from two to five degrees, as will be described hereinafter.

The contact points on plates 68 for the switches 60 and 61 are held against displacement due to jar or ship movement by means of star wheels 107, mounted on the switch shafts 62 between the upper plates 66 and the cover 11, and clamps that are adapted to bear against the periphery of the wheels 107. The clamps comprise two arms 108 having rollers 109 in one end thereof, and the other end 110 secured by means of studs 111 and spacers 112 to the plates 66. Springs 113 fastened to the two arms 108 of the clamps hold rollers 109 between the radial projections of the wheels 107 so that the switches 60 and 61 can only be moved by manual operation of the shafts 62 through handles 64.

In order to determine the amount the vessel has deviated from its course, the pointer 32 that rotates with the card 25 has secured to it by means of bolt and nut 114 and insulating material 115, a spring 116 to which is removably secured by pin 117 a roller housing 118. Inserted in the housing 118 are two threaded rollers 119 having a common axle. These rollers 119 are adapted to rotate on the rings 71 and 73, thereby electrically connecting the two rings when the inner roller is on any one of the segments of the inner ring 71. When the vessel is directly on its course, the roller is on the zero segment 75 which brings the rudder to the amidship or other neutral position, as will be described later.

Below the yaw switches are the engine selective switch 74 and a manual control switch 120. The engine selective switch 74 is arranged to make electrical connections under the following conditions: Both engines ahead, starboard engine stopped, port engine stopped and manual control. The switch 74 is also secured to the cover 11 by studs 76 and nuts 121 and is similar in structure to switches 60 and 61. Switch 74 has a shaft 122 extending through a stuffing box in the cover 11 and fastened to the upper end of the shaft is a handle 123 that has an indicator 124 secured thereto. Secured to the shaft 122 between an upper stationary plate 125 and a lower plate 126 are rotatable contact plates 127 adapted to make the proper electrical connections. The switch 74 is suitably connected by wires to the terminal bases 52 and 53 and the parts or apparatus to be controlled thereby. Positioned around the suffing box of switch 74 and secured to the cover 11 is an indicating plate 128 that designates the position of the switch.

The contact points on plates 127 of the switch 74 are held against displacement due to jar or ship movement by the same means that hold switches 60 and 61, that is, by a star wheel 129 positioned on the switch shaft 122 between the upper plate 125 and the cover 11, and a clamp adapted to bear against the periphery of the wheel 129. The clamp comprises two arms 130 having rollers 131 in one end thereof, and the other end 132 secured by means of studs 133 and spacers 134 to the plate 125. A spring 135 is secured to the arms 130 to hold the rollers 131 between the radial projections of the wheel 129 so that the switch 74 can only be moved by manual operation of the shaft 122 through handle 123.

The manual control switch 120 has an upper plate 136 and lower plate 137 secured to the cover 11 by studs 138. A shaft 139 for contact plates 140, which plates are positioned between the upper plate 136 and the lower plate 137, extends through a stuffing box in the cover 11 and has secured to the upper end, by nut 141 and lock washer 142, a steering lever 143 with knob 144. Fastened to the shaft 139 by pin 145 and flushed with the under side of the cover 11 is a lever 146. A spring 147 is placed around the shaft 139 between the lever 146 and the plate 136. This spring 147 has long protruding ends 148 that bear against an arm 149 of the lever 146. A spring support or stop 150 having an arm 151 is secured to the cover 11 so that when the switch 120 is moved by steering lever 143, one of the protruding ends 148 of the spring 147 bears against the arm 151 of the stop 150 and the other end bears against the arm 149 of the lever 146, so that the switch 120 is always brought back to a neutral position by the spring 147 when there is no pressure on the knob 144.

Positioned in an aperture in the cover 11 over the compass card 25 by means of a flange 152 and a ring 153, secured to the cover 11 by screws 154, are two glass plates 155 forming a window for the compass. The glass plates 155 are made water-tight and are suitably spaced from each other and from the flange 152 and the ring 153 by washers 156. Condensers 157 are fastened to the casing 10 by means of screws 158. These condensers 157 are utilized to absorb the arcs caused in the making and breaking of circuits in the steersman. The left hand one of these three condensers operates especially to reduce arcing at the central segment 75 due to hunting of the repeater.

A rudder angle limit panel 159 controls the amount of corrective rudder which will be applied when the vessel or dirigible moves off the course set. The operation of this panel is in effect that of a limit switch and must be mechanically operated by movement of the rudder of the vessel or dirigible. The panel 159 has a base or frame 160 having bearings 161 on its four corners, and rotatably fitted into said bearings 161 are an upper lead screw 162 and a lower lead screw 163. The lead screws 162 and 163 have drive gears 164 and 165 respectively secured to one end thereof, and on the opposite end are collars 166 and 167. The gears 164 and 165 mesh with an idler gear 168 that is mounted for rotation on a shaft or pin 169 to an arm 170 projecting from the frame 160. The gear 165 meshes with a rudder angle indicator shaft gear (not shown) that is a part of the conventional type electrical steering apparatus. Threaded on screw 162 is a travelling nut 171, Fig. 8, and on lead screw 163 is travelling nut 172. A roller carriage 173 is secured to the travelling nut 171 and adjustably secured to the travelling nut 172, through bearing plate 174, Fig. 5. A set of supporting arms 175 are secured by screws 176, Fig 7, to both sides of the carriage 173 and threaded into the supports are screws 177 having lock nuts 178. The screws 177 bear against plate 174 so as to locate the carriage 173 in relation to the travelling nut 172.

Six rollers 179 electrically connected together and known as right rollers and six rollers 180 electrically connected together and known as left rollers are mounted to the carriage 173 by means of springs 206, Fig. 6, around supports 181, Fig. 8, that are secured to the carriage 173 by lock nuts 182. The rollers 179 and 180 are adapted to move over six pairs of contact bars 255 to 266 inclusive positioned on panel 183 by means of screws 185. Contacts 187 provide for electrical connections to the main body of the contact bars and contacts 186 provide for electrical connections to the segmented ends of the contact bars, whose function will later be described more fully. The bottom two contact bars 265 and 266 are connected respectively through wires 267 and 268, 269 and 270 to a left coil 190 and a right coil 191 of a steering relay and are always in the circuit in series, respectively, with one or another of two pairs of the other ten contact bars, depending upon the engine conditions for which the steersman is set. A first pair is for steering when both engines are running and contact bars 255 and 256 of this pair permit the application of equal amounts of right or left rudder. The two bars 255 and 256 are adjustable electrically for rudder angles of 2°, 3°, 4° or 5°, as will be described later.

A second pair is for steering when operating with the port engine stopped and contact bars 257 and 258 of this pair permit greater right rudder angle than left rudder angle. The bar 257 provides for a rudder angle of zero degrees and is not adjustable, while the bar 258 provides for a rudder angle of eleven degrees right rudder and is electrically adjustable to 12°, 13° and 14° right rudder.

A third pair is for steering when operating with the starboard engine stopped and the contact bars 259 and 260 of this pair permit greater left rudder angles than right rudder angles. The bar 259 provides for a rudder angle of eleven degrees left rudder and is electrically adjustable to 12°, 13° and 14° left rudder, while the bar 260 provides for a rudder angle of zero degrees and is not adjustable.

The pair of the above mentioned contact bars that is in the circuit at any one time is determined by engine selective switch 74 mounted on the face of the steersman. This switch cuts in a separate pair of neutral rudder bars for each of the three engine conditions. The bars 257 and 260 are connected in with the bars 255 and 256 for the "both engines ahead" condition and are of such length that when the rudder is amidship, each one is just clear of its associated roller, but when right rudder is applied, bar 257 is in the circuit and when left rudder is applied, bar 260 is in the circuit. The bars are numbered the same as the corresponding contacts for ease in tracing through the electrical circuits.

Referring to the wiring diagram, Fig. 9, cable 193 is connected to a 20-volt supply. Leads 80, 81, 82 and 83, through leads 271, 272, 273 and 274 respectively, supply power to the step-by-step motor 21. Leads 83 and 84 respectively through leads 274 and 275 provide current for the compass lights 276. Lead 83 is connected through lead 277 to the common end of the relay coils 190 and 191. Now, consider that the ship moves off her course to the left, with the adjustments as shown in Fig. 9, so that roller 119 rests on segment 208a. Relay coil 191 will be energized as follows: from the source of 20-volt supply through leads 84, 278, arm 279, leads 280, 281, 282, ring 73, rollers 119, segment 208a, lead 234, arm 250, leads 244, 246, arm 283, leads 284, 86, 285, bar 256, rollers 179, bar 266, leads 269, 270, relay coil 191, lead 277, to lead 83 of cable 193 and the source of 20-volt potential. Relay coil 191 then closes contact 286, which through leads 77, 288, 287, 79 and cable 198 connect the 120-volt supply to the steering motor to move the rudder right. For this condition of switch 60, regardless of whether or not roller 119 moves farther to the left to the other segments, the electrical connection will still be maintained since the segments 208a, 208b, 208c, 208d and 103 are all electrically connected together through switch 60. The rudder will be moved right until rollers 179 break contact with bar 256 to deenergize relay coil 19, and open contact 286 to stop the steering engine. The rudder will then remain in this right position until the vessel returns to approximately her prescribed course when roller 119 rests on the control segment 75 of inner ring 71, which will energize relay coil 190 as follows: from the source of 20-volt supply through cable 193, leads 84, 278, arm 279, leads 280, 281, 282, ring 73, roller 119, segment 75, lead 289, contact 97, lead 290, arm 291, leads 292, 293, 87, 294, bar 257, rollers 180, bar 265, leads 267, 268, relay coil 190, lead 277 to lead 83 of cable 193 and the source of 20-volt potential. Relay coil 190 then closes contact 295, which through leads 77, 288, 296, 78 and cable 198 connects the 120-volt supply to the steering motor to move the rudder left. The rudder will be moved left until rollers 180 break contact with bar 257 to deenergize relay coil 190 and open contact 295 to stop the steering engine. This will leave the rudder in the neutral position where it will remain until the vessel moves off her prescribed course again.

Now, suppose that the ship moves off her course to the right, with the adjustments as shown in Fig. 9, so that roller 119 rests on segment 207a.

This will energize relay coil 190 as follows: from the 20-volt source of supply through leads 84, 278, arm 279, leads 280, 281, 282, ring 73, rollers 119, segment 207a, lead 297, arm 298, leads 299, 252, 300, arm 301, leads 302, 85, 303, bar 255, rollers 180, bar 265, leads 267, 268, relay coil 190, leads 277 to lead 83 of cable 193 and the source of 20-volt potential. Relay coil 190 then closes contact 295 which through leads 77, 288, 296, 78 and cable 198 connects the 120-volt supply to the steering motor to move the rudder left. For this condition of switch 61, regardless of whether or not roller 119 moves farther to the right to the other segments, the electrical connection will still be maintained since the segments 207a, 207b, 207c, 207d and 102 are all electrically connected together through switch 61. The rudder will be moved left until rollers 180 break contact with bar 255 to deenergize relay coil 190 and open contact 295 to stop the steering engine. As soon as the rudder moves left, bar 260 will be in contact with rollers 179 but this will not affect relay coil 191 because roller 119 is off the center position, i. e. off contact 75. The rudder will remain in the left position until the vessel returns approximately to her prescribed course when roller 119 rests on the central segment 75 of inner ring 71, which will operate to energize relay coil 191 as follows: from the source of 20-volt supply through cable 193, leads 84, 278, arm 279, leads 280, 281, 282, ring 73, roller 119, segment 75, lead 289, contact 97, leads 290, 304, arm 305, leads 306, 307, 90, 308, bar 260, rollers 179, bar 266, leads 269, 270, relay coil 191, lead 277, lead 83, of cable 193 and the source of 20-volt potential. Relay coil 191 then closes contacts 286 which through leads 77, 288, 287, 79 and cable 198 connects the 120-volt supply to the steering motor to move the rudder right. The rudder will be moved right until roller 179 breaks contact with bar 260 to deenergize relay coil 191 and open contact 286 to stop the steering engine. This will leave the rudder in the neutral position, as neither bar 257 or 260 will be in contact with its associated rollers, and the rudder will remain there until the vessel again moves off her prescribed course. This provision for bringing the rudder to its amidship position when the vessel returns to its selected course is an improvement over the invention described in my pending application Serial Number 470,431, filed July 24, 1930, now Patent Number 1,927,935.

While engine selective switch 74 is on position 2 for "both engines ahead" and the bars 255 and 256 are in the circuit for controlling the rudder, the amount of right or left rudder that is applied when the vessel moves off her course is adjustable by means of segments 255a, 255b, 255c and 256a, 256b, 256c, Fig. 9, through switches 196 and 197. These segments are insulated from each other and are at an angle in relation to the axle of the contact rollers. The object of having the ends of the contact bars and the segments cut on an angle with the axle of the rollers is to have the roller make contact on the contact bar and a segment at the same time, or to make contact on two segments at the same time. This allows the circuit to the relay coils 190 or 191 to remain closed as the contact rollers move from the contact bars to the segments and from segment to segment. The switches 196 and 197 provide for electrically connecting all segments to each other and to the contact bar, and for successively cutting out one, two or all three segments from the end of the bars. When all the segments are cut out, the bars 255 and 256 provide for two degrees right and left rudder, and as the segments are cut in, the rudder is limited successively to 3°, 4° or 5°. The amounts of right or left rudder to be applied are independently adjustable. The switches 196 and 197 are for convenience shown mounted on a panel 205 attached to the rudder angle limit panel. However, in operation it is intended that these should be mounted near the steersman. These switches 196 and 197 are secured to panel 205 by studs 209 and nuts 210 and are provided with shafts 211 that extend through panel 205 and have on their upper ends handles 212 to which pointers or indicators 213 are secured. Secured to the shafts 211 between upper stationary plates 214 and lower stationary plates 215 are rotatable contact plates 216 adapted to make proper electrical connections. These switches 196 and 197 are suitably connected by wires to the segments 255a, 255b, 255c and 256a, 256b, 256c. Positioned around the switches on panel 205 are indicating plates 217 that designate the positions of the switches.

The contact points on plates 216 are held against displacement due to jar by the same means that hold switches 60 and 61, that is, by star wheels 218 positioned on shafts 211 above the upper plates 214, and clamps adapted to bear on the peripheries of the wheels 218. Each clamp comprises two arms 219 having rollers in one end thereof, and the other end secured by means of studs 220 and spacers 221 to the plate 214. Springs 222 are secured to the arms 219 so that the switches 196 and 197 can only be moved by manual operation of the shafts 211 through the handles 212.

The details of the electrical connections of switch 196 are as follows: Bar 256 and segments 256a, 256b, 256c are connected respectively by wires 309, 310, 311 and 312 to contacts 325, 326, 327 and 328 of switch 196; bar 258 and segments 258a, 258b, 258c are connected respectively by wires 313, 314, 315 and 316 to contacts 329, 330, 331 and 332 of switch 196; bar 263 and segments 263a, 263b, 263c are connected respectively by wires 321, 322, 323 and 324 to contacts 337, 338, 339 and 340 of switch 196; and bar 264 and segments 264a, 264b, 264c are connected respectively by wires 317, 318, 319 and 320 to contacts 333, 334, 335, 336 of switch 196.

In the position shown of switch 196 marked "base" switch arm 341 is touching contact 325 but does not touch contacts 326, 327, 328 and hence segments 256a, 256b and 256c are not electrically connected to bar 256; switch arm 342 is touching contact 329 but does not touch contacts 330, 331, 332 and hence segments 258a, 258b, 258c are not electrically connected to bar 258; switch arm 343 is touching contacts 337, 338, 339, 340 and hence segments 263a, 263b, 263c are all electrically connected to bar 263; and switch arm 344 is touching contact 333 but does not touch contacts 334, 335, 336 and hence segments 264a, 264b, 264c are not electrically connected to bar 264. Bar 256 controls the amount of right rudder for the "both engines ahead" condition, bar 258 controls the amount of right rudder and bars 263 and 264 the neutral position of the rudder for the "port engine stopped" condition. When switch 196 is adjusted to the "+1°" position, switch arms 341, 342, 343 and 344 all move together so that segment 256a is electrically connected to bar 256, segment 258a, is electrically connected to 258, segments 263a, 263b are connected to bar 263 and segment 264a is connected to bar 264; when on the "+2°" position segments 256a, 256b are electrically connected to bar 256; segments 258a, 258b are electrically connected to bar 258, segment 263a is electrically connected to bar 263 and segments 264a, 264b are electrically connected to 264; when on the "+3°" position segments 256a, 256b, 256c are electrically connected to bar 256, segments 258a, 258b, 258c are electrically connected to bar 258, no segments are electrically connected to bar 263, and segments 264a, 264b, 264c are electrically connected to bar 264.

It will be seen that as segments are electrically disconnected from bar 263 they are electrically connected to bar 264 thus serving to shift the neutral position of the rudder for the "port engine stopped" condition. Bars 255, 259, 261, 262, are similarly connected and controlled by switch 197. Bar 255 controls the amount of left rudder for the "both engines ahead" condition, bar 259 controls the amount of left rudder and bars 261, 262 the neutral position of the rudder for the "starboard engine stopped" condition. Switch 197 operates similarly to switch 196 for the "+1°", "+2°", and "+3°" positions.

The bars 263 and 264 are connected in with the bars 257 and 258 for the "port engine stopped" condition with switch 74 set at position 1, and are of such length that when the rudder is 5° right, the bar 263 and its segments, which are all electrically connected by switch 197 in the position shown, are clear of roller 180, and the bar 264, all its segments being disconnected by switch 197 in the position shown, is clear of rollers 179. This adustment provides for the neutral position of the rudder being 5° right.

As the vessel moves off her course to the right, roller 119 and bar 257 will close the circuit to relay coil 190 to bring the rudder amidship. This is left rudder when the port engine is stopped due to the fact that the right propeller tends to make the vessel veer to port. When the vessel returns to her course, roller 119 through segment 75 and bar 264 energizes relay coil 191 to start the steering motor and bring the rudder back to 5° right. Should the vessel move off its course to the left, roller 119 and bar 258 will close the circuit to relay coil 191 to bring the rudder to 11° right. This will bring the vessel back toward her course and when she is approximately on her course, roller 119 through segment 75 and bar 263 will energize relay coil 190 to bring the rudder to 5° right. Bar 258 can be electrically adjusted by switch 196 to increase the amount of right rudder applied to 12°, 13° or 14°, and switch 196 at the same time moves the neutral position of the rudder to 6°, 7° or 8° by cutting out segments on bar 263 and at the same time cutting in segments on bar 264.

The electrical circuits for this condition are as follows: When the ship moves off her course to the left current flows from the 20-volt supply through leads 84, 278, switch arm 279 (which has been moved one space to the right), leads 281, 282, ring 73, rollers 119, segment 208a, lead 234, switch arm 250, leads 244, 246, switch arm 283, (which has been moved one space to the right) lead 345, switch arm 346, leads 347, 88, 348, bar 258, rollers 179, bar 266, leads 269, 270, relay coil 191, lead 277, lead 83 of the cable 193 to the source of 20-volt potential. This will apply right angle rudder as previously described and the rudder will move right until rollers 179 break contact with bar 258 to deenergize relay coil 191. The rudder will remain in this right position until the vessel returns to approximately her prescribed course—when roller 119 rests on the central segment 75 of inner ring 71, which will energize relay coil 190 as follows: from the source of 20-volt supply through cable 193, leads 84, 278, arm 279 (which has been moved one space to the right), leads 281, 282, ring 73, roller 119, segment 75, lead 289, contact 97, leads 290, 304, arm 305 (which has been moved one space to the left), leads 349, 93, 350, bar 263, rollers 180, bar 265, leads 267, 268, relay coil 190, lead 277 to lead 83 of cable 193 and the source of 20-volt potential. This will move the rudder left to the neutral position (5° right as shown) where rollers 180 break contact with bar 263 to deenergize relay coil 190.

When the vessel moves off her course to the right current flows from the 20-volt supply through leads 84, 278, switch arm 279 (which has been moved one space to the right), leads 281, 282, ring 73, rollers 119, segment 207a, leads 297, switch arm 298, leads 299, 252, 300, switch arm 301 (which has been moved one space to the right), leads 293, 87, 294, bar 257, rollers 180, bar 265, leads 267, 268, relay coil 190, leads 277, lead 83 of cable 193 and the source of 20-volt potential. This will move the rudder left until rollers 180 break contact with bar 257 which is the amidships position but is the equivalent of left rudder for the "port engine stopped" condition. When the vessel returns to her prescribed course so that roller 119 rests on segment 75 relay coil 191 will be energized as follows: from the source of 20-volt supply through cable 193, leads 84, 278, arm 279 (which has been moved one space to the right) leads 281, 282, ring 73, roller 119, segment 75, lead 289, contact 97, leads 290, 304, switch arm 305 (which has been moved one space to the left), leads 349, 351, 94, 352, bar 264, rollers 179, bar 266, leads 269, 270, relay coil 191, lead 277, lead 83 of cable 193, and the source of 20-volt potential. This will move the rudder right to the neutral position (5° right as shown) where rollers 179 break contact with bar 264 to deenergize relay coil 191. The rudder will remain in this neutral position until the vessel again moves off her prescribed course.

The bars 261 and 262 are connected in with the bars 259 and 260, for the "starboard engine stopped" condition with switch 74 set at position 3, and are of such length that when the rudder is 5° left, the bar 262 and its segments, that are all electrically connected by switch 196 in the position shown, are clear of rollers 179, and the bar 261, all its segments being disconnected by switch 196 in the position shown, is clear of rollers 180. This adjustment provides for the neutral position of the rudder being 5° left.

As the vessel moves off her course to the left, roller 119 and bar 260 will close the circuit to relay coil 191 to bring the rudder amidship. This is right rudder when the starboard engine is stopped due to the fact that the left propeller tends to make the vessel veer to starboard. When the vessel returns to her course, roller 119 through segment 75 and bar 261 energizes relay coil 190 to start the steering motor and bring the rudder back to 5° left. Should the vessel move off its course to the right, roller 119 and bar 259 will close the circuit to relay coil 190 to bring the rudder to 11° left. This will bring the vessel back toward her course and when she is exactly on her course, roller 119 through segment 75 and bar 262 will energize relay coil 191 to bring the rudder to 5° left. Bar 259 can be electrically adjusted by switch 197 to increase the amount of left rudder applied to 12°, 13° or 14°, and switch 197 at the same time moves the neutral position of the rudder to 6°, 7° or 8° by cutting out segments on bar 262 and at the same time cutting in segments on bar 261.

The electrical circuits for this condition are as follows: When the ship moves off her course to the right current flows from the 20-volt supply through leads 84, 278, 353, switch arm 279 (which has been moved one space to the left), leads 280, 281, 282, ring 73, roller 119, segments 207a, lead 297, switch arm 298, leads 299, 252, arm 354 (which has been moved one space to the left) leads 355, 89, 356, bar 259, roller 180, bar 265, leads 267, 268, relay coil 190, lead 277, lead 83 of cable 193 to the source of 20-volt potential. This will apply left rudder as previously described and the rudder will move left until rollers 180 break contact with bar 259 to deenergize relay coil 190. The rudder will remain in the left position until the vessel returns approximately to her prescribed course when roller 119 rests on segment 75, which will energize relay coil 191 as follows: from the source of 20-volt supply through cable 193, leads 84, 278, 353, arm 279 (which has been moved one space to the left) leads 280, 281, 282, ring 73, roller 119, segment 75, leads 289, contact 97, lead 290, switch arm 291 (which has been moved one space to the right) leads 357, 358, 92, 359, bar 262, roller 179, bar 266, leads 269, 270 relay coil 191, lead 277, lead 83 of cable 193, to the source of 20-volt supply. This will move the rudder right to the neutral position (5° left as shown) where rollers 179 break contact with bar 262 to deenergize relay coil 191.

When the vessel moves off her course to the left current flows from the 20-volt supply through leads 84, 278, 353, switch arm 279 (which has been moved one space to the left), leads 280, 281, 282, ring 73, roller 119, segment 208a, lead 234, arm 250, leads 244, 246, 360, arm 361, (which has been moved one space to the right) leads 307, 90, 308, bar 260, roller 179, bar 266, leads 269, 270, relay 191, lead 277, lead 83 of cable 193 to the source of 20-volt potential. This will move the rudder right until rollers 179 break contact with bar 260, which is the amidships position but is the equivalent of right rudder for the "starboard engine stopped" condition. When the vessel returns to her prescribed course so that roller 119 rests on segment 75 relay coil 190 will be energized as follows: from the source of 20-volt supply through cable 193, leads 84, 278, 353, switch arm 279 (which has been moved one space to the left) leads 280, 281, 282, ring 73, roller 119, segment 75, lead 289, contact 97, leads 290, switch arm 291 (which has been moved one space to the right) leads 357, 91, 363, bar 261, rollers 180, bar 265, leads 267, 268, relay coil 190, lead 277, lead 83 of cable 193 to the source of 20-volt potential. This will move the rudder left to the neutral position (5° left as shown) where rollers 180 break contact with bar 261. The rudder will remain in this neutral position until the vessel again moves off her prescribed course.

During any one of the above engine conditions the amount of yaw, desired to starboard or port, before corrective rudder is applied, is electrically adjustable by switches 60 and 61. Switch 60, when in the position shown, electrically connects the first four small segments 208a, 208b, 208c, 208d located to the left of segment 75, Fig. 3, to segment 103, and switch 61 likewise electrically connects the first four small segments 207 located to the right of segment 75 to segment 102. As each switch is turned clockwise, the first small segment to segment 75 is disconnected, then the first two segments are disconnected, etc., until all four small segments are disconnected from segments 102 and 103 respectively. This provides for yaw of ½°, 2°, 3½°, 5° or 7° to port or starboard before corrective rudder is applied. These switches are adjustable independently so that more yaw can be had to starboard than port, if desirable, or vice versa. During rough weather a vessel yaws considerably to either side of its course without departing permanently from said course. To attempt to correct this by operation of the rudder would needlessly retard the motion of the vessel and result in excessive wear of the steering mechanism. Hence, the desirability of being able to adjust the sensitivity of the steering apparatus to suit the weather conditions.

The details of the electrical connections of switch 60 are as follows: segments 208a, 208b, 208c, 208d and 103 are connected respectively by wires 234, 235, 236, 237 and 238 to contacts 239, 240, 241, 242 and 243. Contact 243 through wire 244 is connected to contact 245 and in turn through wire 246 to contact 247 of switch 74. Contact 242 through wire 248 is connected to contact 249. In the position of switch 60 shown segments 208a, 208b, 208c, 103 through wires 234, 235, 236, 238 respectively, switch arm 250, and wire 244 are connected to contact 245. Segment 208d through wire 237 and switch arm 251 is connected to contact 245. It is thus seen that segments 208a, 208b, 208c, 208d and 103 are all electrically connected to contact 245 and through wire 246 to contact 247 of switch 74. As the switch 60 is turned to the position marked "2°" the switch arms 250 and 251 move together and switch arm 250 moves away from contact 239 thereby disconnecting segment 208a but leaving 208b, 208c, 208d and 103 electrically connected together and to switch 74. When switch 60 is adjusted to the position marked "3½°" the switch arm 250 moves clockwise away from contact 240, thereby disconnecting segments 208a and 208b but leaving 208c, 208d and 103 electrically connected together and to switch 74. When switch 60 is adjusted to the position marked "5°" the switch arm 250 moves clockwise away from contact 241 thereby disconnecting segments 208a, 208b, 208c. Switch arm 251 moves away from contact 242 but retains contact with 249 which through wire 248 is connected to contact 242 and segment 208d so that segments 208d and 103 are electrically connected together and to switch 74. When the switch 60 is adjusted to position marked "7°" the resulting movement of switch arm 250 has no effect but the switch arm 251 in moving clockwise away from contact 245 disconnects segment 208d so that segment 103 alone through wires 238, 244 and 246 is connected to switch 74. The segments 207a, 207b, 207c, 207d and 102 are similarly electrically connected and controlled through switch 61 and through wire 252 to contact 253 of switch 74.

When a large change is desired in the course of the vessel, then the rudder easing segments 100 and 101 come into play. That is, when the change in course is made through the coarse-setting gearing of the pointer 32 and automatic steering is used. For example, suppose the vessel is on course 360° and a course of 270° is desired, the switch 74 being set for "both engines ahead". The pointer 32 is caused to rotate to 270° on the repeater dial 25 by the course-setting knob 49. The roller 119 is moved to the right and makes contact with segment 105 that through wires 232, 89, 356 is connected directly to bar 259, without going through switch 74, that allows 11° left rudder. Now the vessel will swing to port and as the rudder is held in this position, the vessel will move quite rapidly toward the new course. To prevent the vessel from swinging too rapidly as it nears the new course, which would result in the vessel swinging beyond the new course, the segments 100 and 101 provide for easing the rudder. As roller 119 makes contact with segment 101 that through wires 231, 90 and 308 is directly connected to bar 260, without going through switch 74, the rudder is moved toward 0°. This connection will not be maintained sufficiently for the rudder to reach the amidship position but the rate of veering of the ship will be reduced and as roller 119 makes contact with segment 75, the connection through bar 260 as previously described will bring the rudder back to zero. The operation would be similar if the new course had been to starboard, but segment 106 through wires 233, 88, 348 and bar 258 would have applied 11° right rudder, segment 100 through wires 230, 87, 294 and bar 257 would have eased the rudder and segment 75 and bar 257 would have brought the rudder to the amidship position.

The complete electrical circuits for the above operations are as follows: From supply, leads 84, 278, arm 279, leads 280, 281, 282, ring 73, rollers 119, segment 105, leads 232, 89, 356, bar 259, rollers 180, bar 265, leads 267, 268, relay coil 190, leads 277, 83 to supply; from supply, leads 84, 278, arm 279, leads 280, 281, 282, ring 73, rollers 119, segment 101, leads 231, 90, 308, bar 260, rollers 179, bar 266, leads 269, 270, relay coil 191, leads 277, 83 to supply; and from supply, leads 84, 278, arm 279, leads 280, 281, 282, ring 73, rollers 119, segment 106, leads 233, 88, 348, bar 258, rollers 179, bar 266, leads 269, 270, relay coil 191, leads 277, 83 to supply; and from supply, leads 84, 278, arm 279, leads 280, 281, 282, ring 73, rollers 119, segment 100, leads 230, 87, 294, bar 257, roller 180, bar 265, leads 267, 268, relay coil 190, leads 277, 83 to supply.

The condensers 198 absorb the arcs created by making and breaking circuits in the rudder angle limit panel and relay. Bars 255, 257, 259, 261, 263, each of which operates to close a circuit to the relay coil 190, are through pairs of leads 303 and 364, 294 and 365, 356 and 366, 363 and 367, 350 and 368, connected respectively to one side of condensers 198a, 198b, 198c, 198d, 198e while the other sides of these condensers are connected back to these bars through leads 369, 267 and rollers 180. Similarly, bars 256, 258, 260, 262, 264 are, through pairs of leads 285 and 370, 348 and 371, 308 and 372, 359 and 373, 352 and 374, connected respectively to one side of condensers 198f, 198g, 198h, 198i, 198j while to other sides of these condensers are connected back to these bars through leads, 375, 269 and rollers 179.

One side of contact 295 through leads 296, 376 is connected to one side of condensers 198k and one side of contact 286 through leads 287, 377 is connected to one side of condensers 198L, while other side of these contacts are through leads 288, 378 connected to the other sides of these condensers. The terminal bases 199 and 200 provide for making the electrical connection in the rudder angle limit panel.

When manual control is desired, switch 74 is moved to position 4. This disconnects all bars of the rudder angle limit panel from segments 102, 103 and 75 and also disconnects the common ring 73, but connects lead 84, which is common, to lead 99 of the manual control switch 120. Moving the handle of switch 120 to the left causes current to flow from supply through leads 84, 278, 353, switch arm 279 (which has been moved two spaces to the left), lead 99, switch arm 379, leads 380, 96, 270, coil 191, leads 277, 83 to supply. This energizes the steering motor to move the rudder right. When the handle of switch 120 is returned to its neutral position, the rudder remains right. Moving the handle of switch 120 to the right causes current to flow from supply through leads 84, 278, 353, switch arm 279, lead 99, switch arm 379, leads 381, 95, 268, relay coil 190, leads 277, 83 to supply. This energizes the steering motor to move the rudder left to amidship or more, as necessary. As the common ring 73 is disconnected, the segments 75, 100, 101, 102, 103, 105 and 106 are all inoperative, but in order to disconnect a parallel circuit between leads 88 and 91 by switch 120, lead 345 is broken by switch 120 when it is moved either to the right or left of its neutral position. Since rollers 179 are in contact with bar 258 and rollers 180 are in contact with bar 261, the parallel circuit would energize both relay coils 190 and 191 when switch 120 is moved either way. The parallel circuit is due to switch arm 291 being moved two spaces to the right for position "4" where it connects leads 345 and 357. The parallel circuits are as follows: from supply leads 84, 278, 353, switch arm 279 (which has been moved two spaces to the left) lead 99, switch arm 379, leads 380, 96, 270, relay coil 191, leads 277, 83 to supply; and from supply as above through the same circuit to lead 96 thence lead 269, bar 266, rollers 179, bar 258, leads 348, 88, 347, switch arm 346 (if it were not moved), leads 345, switch arm 291 (which has been moved two spaces to the right) leads 357, 91, 363, bar 261, rollers 180, bar 265, leads 267, 268, relay coil 190, leads 277, 83, to supply. If the switch arm 379 is moved to the right the same parallel circuit would be effective to energize both relay coils 190 and 191. Hence the necessity of providing some means of disconnecting this parallel circuit.

The coils 190 and 191 of the relay are secured to the rudder angle limit panel and have an armature 201 that has affixed thereto contact springs 202 adapted to make contact which will cause the control switches of the rudder steering apparatus to be energized. A spring 203 is secured to the relay armature 201 and held in position by screws 204 and allows the necessary motion of the armature in response to coil 190 or 191 to close its associated contact.

The steersman is portable and is so arranged that it can be connected for control through connection plugs located at various parts of the vessel or dirigible.

The rudder adjustment panel 205 as stated before will be mounted on or near the steersman and not on the rudder angle limit panel, as shown. This enables the person controlling the vessel to make and to check rudder adjustments quickly and easily and by trying various ones to arrive at an adjustment suitable for the conditions of weather and speed of the vessel. Such manipulation would be extremely slow and unsatisfactory if a man had to be sent to the rudder angle limit panel, that is ordinarily located near the rudder, to make each adjustment.

With the older types of automatic steersman the rudder was never amidship except when moving from right to left or vice versa. This resulted in excessive use of the rudder and reduction in the speed of the vessel. This invention is an improvement in this respect in that it brings the rudder amidship or to a neutral position when the vessel is on the preselected course.

The mechanical transmission between the rudder and the rudder angle limit panel 159 must be designed to suit the actual steering arrangements in the vessel in which the steersman is to be installed. In some vessels having a mechanically operated rudder angle indicator as standard equipment, arrangements may be provided for driving the rudder angle limit panel from the shaft which operates the rudder angle indicator. In vessels or dirigibles that are not equipped with a rudder angle indicator, the rudder angle limit panel 159 must be located in the immediate vicinity of the steering gear and operated by a mechanical connection to the steering gear.

Although I have used certain definite values in degrees throughout the specification, I desire it to be understood that these values may be varied to suit a particular installation.

To make my device ready for operation, the proper switches are closed to energize the system and the repeater compass card 25 is synchronized with the master compass by synchronizer 26. Manual control will ordinarily be used first, so switch 74 will be set on position 4. Before shifting to automatic steering, the pointer 32 must be set to the desired course. Cap 51 is removed and knob 49 is pressed down and turned until pinion 48 meshes with gear 36. Further turning of knob 49 will cause gear 35 through gear 41 to turn shaft 40 mounted on pointer 32 so that pinion 43 will rotate around gear 31, thereby setting the pointer 32 to the desired course. The torque set up in the repeater compass when the same is synchronized with the master compass holds card 25 from turning with pointer 32. The engine selective switch 74 is then turned to the proper position depending upon the engine conditions, that is "both engines ahead", "starboard engine stopped" or "port engine stopped". The yaw switches 60 and 61 are then set to give an angle of yaw suitable to the weather conditions, as previously described, and the rudder adjustment switches will be set to allow a rudder movement that will check the deviation and bring the vessel promptly back to her course. To change the course when steering automatically, it is only necessary to reset the pointer 39 by the knob 49. To change from automatic steering to manual control, the switch 74 is turned to the position marked "manual control" at which point the rudder can be controlled directly by movement of the manual control switch 120.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalty thereon.

What I claim is:

1. In combination with an automatic steersman, a rudder angle limit panel, and means for electrically adjusting said rudder angle limit panel from a distant station.

2. In a rudder angle limit panel comprising a base, six pairs of contact bars mounted on said base, relay coils having first terminals connected one to each of a first pair of said bars, and means adapted to move over said bars for connecting one or another group of four of the other ten contact bars so that two bars of said group are in circuits respectively with each of said first pair of bars connected to said relay coils said group of four other contact bars being connected by automatic steering mechanism to a source of electrical potential and the other terminals of said relay coils being connected back to said source potential.

3. In a rudder angle limit panel comprising a base, six pairs of contact bars mounted on said base, relay coils having first terminals connected one to each of a first pair of said bars, means adapted to move over said bars for connecting one or another group of four of the other ten contact bars so that two bars of said group are in circuits respectively with each of said first pair of bars connected to said relay coils, and means for actuating said moving contact means said group of four other contact bars being connected by automatic steering mechanism to a source of electrical potential and the other terminals of said relay coils being connected back to said source of potential.

4. In a rudder angle limit panel comprising a base, six pairs of contact bars mounted on said base, relay coils having first terminals connected one with each of a first pair of said bars, and means adapted to move over said bars for connecting one or another group of two pairs of the other ten contact bars in circuits with the said pair of bars connected to the relay coils said group of two pairs of other contact bars being connected by automatic steering mechanism to a source of electrical potential and the other terminals of said relay coils being connected back to said source of potential.

5. In a rudder angle limit panel comprising a base, six pairs of contact bars mounted on said base, means for adjusting electrically from a distant station the length of the active portion of a plurality of said bars, relay coils having first terminals connected one with each of a first pair of said bars, and means adapted to move over said bars for connecting one or another group of two pairs of the other ten contact bars in circuits with the said pair of bars connected to the relay coils said group of two pairs of other contact bars being connected by automatic steering mechanism to a source of electrical potential and the other terminals of said relay coils being connected back to said source of potential.

6. In a rudder angle limit panel comprising a base, six pairs of contact bars mounted on said base, means for electrically adjusting the length of the active portion of a plurality of said bars, a steering relay having a right coil having one terminal connected to one of a first pair of said bars and a left coil having one terminal connected to the other bar of said first pair of contact bars, a roller carriage having multiple contact rollers adapted to move over said contact bars for connecting two pairs of the remaining ten bars in circuits with the pair of bars connected to the steering relay, and means for moving said carriage over the contact bars said group of two pairs of remaining contact bars being connected by automatic steering mechanism to a source of electrical potential and the other terminals of said relay coils being connected back to said source of potential.

7. In a rudder angle limit panel comprising a base, six pairs of contact bars mounted on said base, means for electrically adjusting the length of the active portion of a plurality of said bars a steering relay having a right coil with a first terminal connected to one of a first pair of said bars and a left coil with a first terminal connected to the other bar of said pair of contact bars, a roller carriage having multiple contact rollers adapted to move over said contact bars for connecting two pairs of the remaining ten bars in circuits with the pair of bars connected to the steering relay, and lead screws having gears on the end thereof adapted to move said carriage over the contact bars said group of two pairs of remaining contact bars being connected by automatic steering mechanism to a source of electrical potential and the other terminals of said relay coils being connected back to said source of potential.

8. In combination with a vessel, a rudder angle limit panel comprising a base, six pairs of contact bars mounted on said base, a steering relay having two coils with first terminals connected one with each of a first pair of said bars, means adapted to move over said bars for connecting one or another group of two pairs of the other ten contact bars in circuits with the pair of bars connected to the relay, and an automatic steersman having means for selecting said group of two pairs of contact bars for operation under various engine conditions of the vessel said group of two pairs of other contact bars being connected by automatic steering mechanism to a source of electrical potential and the other terminals of said relay coils being connected back to said source of potential.

9. In combination with a vessel, a rudder angle limit panel comprising a base, six pairs of contact bars mounted on said base, means for adjusting electrically from a distant station the length of the active portion of a plurality of said bars, a steering relay having two coils with first terminals connected one with each of a first pair of said bars, means adapted to move over said bars for connecting one or another group of two pairs of the other ten contact bars in circuits with the pair of bars connected to the relay, and an automatic steersman having means for selecting said groups of two pairs of contact bars for operation under various engine conditions of the vessel said groups of two pairs of other contact bars being connected by automatic steering mechanism to a source of electrical potential and the other terminals of said relay coils being connected back to said source of potential.

10. In a combined automatic steersman and rudder angle limit panel, control means for adjusting the rudder angle limit panel for operation under varying engine conditions of the vessel, means for correcting deviations from a preselected course, and means for returning said correcting means to a neutral position when the vessel is approximately on the preselected course.

11. In combination with a dirigible, an automatic steersman having a repeater compass, means for setting a preselected course for the dirigible on said compass, a rudder angle limit panel adapted to regulate the corrective rudder applied to said dirigible, means setting up a first circuit including said rudder angle limit panel when the dirigible deviates from the set course for applying corrective rudder, means setting up a second circuit including said rudder angle limit panel when the dirigible returns to the preselected course for returning the rudder to a neutral position, and control means connected to said rudder angle limit panel for independently determining the port and starboard limits of rudder angles to be used under varying operative engine conditions of the dirigible.

12. In combination with a dirigible, an automatic steersman having a repeater compass, means for setting a preselected course on said compass, means for applying corrective rudder when the dirigible moves off the preselected course, means for returning the rudder to a neutral position when the dirigible is approximately on the preselected course, means for applying corrective rudder only after a definite angle of yaw, and a control switch connected to said course setting means, yaw means and rudder correcting and neutral return means for adjusting the same for operation under varying engine conditions of the dirigible.

13. In combination with a vessel, an automatic steersman having a repeater compass, means for setting a preselected course for the vessel on said compass, means for applying corrective rudder when the vessel moves off the preselected course, means for returning the rudder to a neutral position when the vessel is approximately on the preselected course, independently adjustable means for applying corrective rudder only after a predetermined angle of starboard yaw and independently adjustable means for applying corrective rudder only after a predetermined angle of port yaw, and means connected with said course setting means, rudder correcting and neutral return means, starboard and port yaw means, for adjusting the same for operation under varying engine conditions of the vessel.

14. In combination with a vessel, a repeater compass and an automatic steersman comprising a means for setting a preselected course on said compass, means around said compass for setting up a first circuit when the vessel deviates from the preselected course and for setting up a second circuit when the vessel returns to the preselected course, a port yaw switch and a starboard yaw switch connected with said first circuit means for completing said first circuit only after a definite amount of port or starboard yaw of the vessel, a manual control means, and a control switch connected to said port and starboard switches, to said first and second circuit means and to said manual control means for adjusting the same and to connect the said yaw switches and first and second circuit means for operation under varying engine conditions of the vessel.

15. In an automatic steersman, means for applying large rudder angles when making large changes in course, means for easing the rudder before the vessel arrives at the new course, and means for returning the rudder to a neutral position when the vessel is approximately on the new course.

16. In an automatic steersman, means for correcting deviations from a preselected course, independently adjustable port and starboard yaw means for applying corrective rudder only after predetermined angles of yaw, and means for returning said correcting means to a neutral position when the vessel is approximately on the preselected course.

17. In a rudder angle limit panel comprising a base, six pairs of contact bars mounted on said base, relay coils having first terminals connected one to each of the first pair of said bars, and means adapted to move over said bars for connecting one or another of a group of two pairs of the other ten contact bars so that two bars of said group are in circuits with one of said first pair of bars and the other two bars of said group are in circuits with the other of said first pair of bars whereby one pair of said group is available for controlling the right and the left movements of the rudder and the other pair of said group is available for returning said rudder to a neutral position, said group of two pairs of other contact bars being connected by automatic steering mechanism to a source of electrical potential and the other terminal of said relay coils being connected back to said source of potential.

HYDE A. HARMAN.